March 6, 1951     H. B. DUNCAN     2,544,302
HEADING DIE AND METHOD OF MAKING IT
Filed Aug. 30, 1945
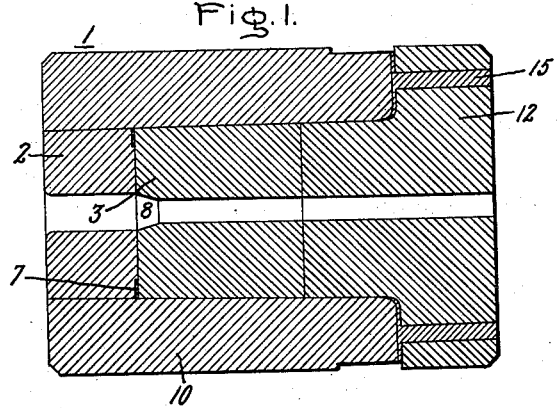
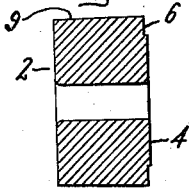 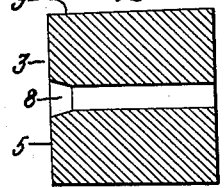
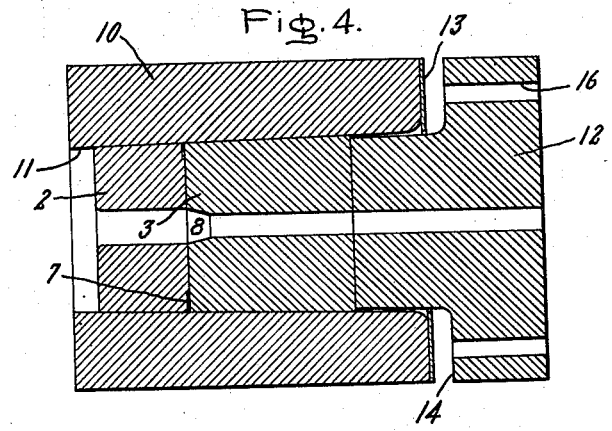
Inventor:
Hershel B. Duncan,
by Harry E. Dunham
His Attorney Patented Mar. 6, 1951

2,544,302

UNITED STATES PATENT OFFICE 2,544,302

HEADING DIE AND METHOD OF MAKING IT

Hershel B. Duncan, Detroit, Mich., assignor to Carboloy Company, Inc., Detroit, Mich., a corporation of New York Application August 30, 1945, Serial No. 613,510

5 Claims. (Cl. 78—62)

The present invention is a die and more particularly a heading die and method for making it. Heretofore the construction of such dies has presented considerable difficulty due generally to the intricate shape and depth of the die opening and the limited tolerances permitted in its dimensions. Such dies generally have been made in one piece and then provided with a steel casing shrunk onto and around the die. However, the fabrication of a one-piece stepped die is expensive since several hours are required to lap the die hole to the required dimensions. Furthermore, dies as fabricated heretofore frequently were unsatisfactory since the steel die casing often did not fit accurately at all points within the casing and as a result such dies were subject to frequent breakage.

It is one of the objects of the present invention to provide a heading die which may be fabricated in a minimum period of time. A further object of the invention is the provision of a heading die in which losses from breakage are substantially reduced. A further object of the invention is the provision of a simple process for making extrusion and heading dies having intricate shapes. Other objects will appear hereinafter.

The novel features which are characteristic of my invention are set forth with particularity in the appended claims. My invention itself, however, will best be understood from reference to the following specification when considered in connection with the accompanying drawing in which Fig. 1 is a cross section on an enlarged scale of a heading and extrusion die embodying the features of the present invention; Fig. 2 is a cross section of the outer portion of the die nib disclosed in Fig. 1; Fig. 3 is a cross sectional view of the inner portion of the die nib disclosed in Fig. 1; while Fig. 4 illustrates the position of the complete die nib and back plug assembled in casing sleeve at an intermediate point in the manufacture of the die.

Referring more particularly to the drawing, I have indicated as a whole at 1 a cemented carbide die comprising die nib sections 2 and 3. The juxtaposed contacting surfaces 4 and 5 of sections 2 and 3 respectively are machined to fit accurately over their entire contact surfaces. A ring shaped recess 6 about .001 to .003" thick and about $\frac{1}{16}$" wide is provided around the outer periphery of the contact surface 4 on section 2. A ring of hard solder 7 is placed in the recess 6 and when the two sections of the die nib are assembled under pressure the hard solder is melted thereby securing sections 2 and 3 firmly together. The molten hard solder does not extend beyond the recess 6 and as a result the abutting surfaces 4 and 5 of sections 2 and 3 are in direct contact over their entire area.

The fabrication of the die in two sections greatly facilitates lapping of the restricted opening 8 in the die nib since such construction makes the opening readily accessible. Since the hard solder does not extend beyond recess 6 my improved sectionalized die may be subjected to great compressive force or heavy hammer blows, such as occur in the use of heading dies, without causing failure of the die since the effect of such compressive forces or heavy blows in the heading process is applied directly to the contacting sections of the die and not transmitted through an intermediate layer of hard solder between the die sections.

The outer surface 9 of the die nib is slightly tapered. For example tangent lines at opposite points of a diameter of the nib form an angle of about 2°. The steel casing 10 which encloses and supports the die nib has an inner tapered surface 11 corresponding to the tapered surface on the nib. Since the inner surface 11 of the casing 10 and the outer surface 9 of the die nib are ground straight taper, a perfect metal-to-metal contact of the casing and die nib is provided.

When the die nib is inserted in the casing 10 it takes the position illustrated in Fig. 4 of the drawing. At that time a flanged nib supporting or back plug 12 is inserted in casing 10 and a steel shim 13 about 0.002" thick placed between the flange 14 of the plug 12 and the end of the casing. The portion of casing 10 in contact with the die nib is now heated to a temperature high enough to expand the casing while pressure is applied to the back plug 12 to thereby force the die nib to its final position in the casing. Thereafter the back plug 12 is withdrawn from the casing and the steel shim 13 removed. When the casing cools it shrinks onto the die nib forming complete surface contact therewith. The back plug is now replaced and pressure is applied to hold it securely against the back end of the nib. The casing and back plug are now heated by induction at the point of union, while hard solder, silver, or a similar material 15 is fed through a plurality of small holes 16 drilled through the flange of the back plug until all the opening produced by the insertion of shim 13 during shrinking and seating of nib is completely filled.

The contacting tapered surfaces of the casing and die nib provide a dove-tail seat. The application of pressure to the die nib, while the casing is heated to thereby force the die nib to its final position, preloads the die nib from the rear or outer end thereof. This preloading places the die nib under very great pressure so that any force applied against the face of the nib in normal operation will not suffice to disturb the preloaded condition of the nib.

My improved die permits the manufacture of dies of intricate shape without difficulty. Also, since the two sections of the die are in direct contact over substantially their entire abutting surfaces, the die possesses substantially the strength of a one-piece die. It will be clear that although my improved die is particularly suitable for use as a heading die it may be used for extrusion or other purposes without departing from the scope of my invention.

What I claim as new and desire to secure by Letters Patent of the United States, is:

1. A two-piece die nib, the juxtaposed surfaces of said pieces being in direct contact with each other, and a ring of solder connecting said pieces, said solder being positioned in a recess in one of said pieces whereby any pressure applied to said die nib is not transmitted through said solder.

2. A two-piece die nib, the juxtaposed surfaces of said pieces being in direct contact with each other, one of said pieces being provided with a recess adapted to contain solder for securing said pieces in direct contact with one another whereby pressure applied to said die nib is not transmitted through said solder.

3. A die comprising a steel casing having a straight tapered inner surface and a tapered two-piece die nib seated within said casing, the juxtaposed surfaces of said two-piece die being in direct contact with each other, and a ring of solder connecting said pieces, said solder being positioned in a recess in one of said pieces whereby any pressure applied to said die nib is not transmitted through said solder.

4. A method of making a die comprising a tapered die nib having an opening therethrough and a casing therefor having a corresponding tapered surface, the smallest diameter of said surface being at the inlet end of the die, said method comprising applying pressure by means of a flanged plug to the outlet end of said nib to force it to its seat in said casing while said casing is in an expanded condition, limiting the movement of said plug in said casing to provide a space between the adjacent end of said casing and the flange on said plug, and thereafter filling said space with solder.

5. The method claimed in claim 4 including the step of contracting said casing to place said nib in radial compression.

HERSHEL B. DUNCAN.

REFERENCES CITED

The following references are of record in the file of this patent:

UNITED STATES PATENTS

| Number | Name | Date |
|---|---|---|
| 142,407 | Mullin | Sept. 2, 1873 |
| 329,801 | Allderdice | Nov. 3, 1885 |
| 865,759 | Butts | Sept. 10, 1907 |
| 1,395,217 | Begot | Oct. 25, 1921 |
| 1,420,224 | Simons | June 20, 1922 |
| 1,582,434 | Simons | Apr. 27, 1926 |
| 1,624,027 | Vollmer | Apr. 12, 1927 |
| 1,747,911 | Simons | Feb. 18, 1930 |
| 1,904,698 | Simons | Apr. 18, 1933 |
| 1,918,858 | Metzger | July 18, 1933 |
| 1,935,621 | Simons | Nov. 21, 1933 |
| 2,027,787 | Ridgway et al. | Jan. 14, 1936 |
| 2,044,986 | Horton | June 23, 1936 |
| 2,101,689 | Richardson | Dec. 7, 1937 |
| 2,111,046 | Friedman | Mar. 15, 1938 |
| 2,146,995 | Simons | Feb. 14, 1939 |
| 2,232,417 | Unckel | Feb. 18, 1941 |
| 2,245,608 | Rogers | June 17, 1941 |
| 2,332,704 | Enes et al. | Oct. 26, 1943 |